United States Patent
Kang

(10) Patent No.: US 9,569,870 B2
(45) Date of Patent: Feb. 14, 2017

(54) SYSTEM AND METHOD FOR GENERATING MULTIPLE MASTER GLYPH

(71) Applicant: HANYANG INFORMATION & COMMUNICATIONS CO., LTD., Seoul (KR)

(72) Inventor: Kyung Soo Kang, Seoul (KR)

(73) Assignee: HANYANG INFORMATION & COMMUNICATIONS CO., LTD., Seoul (KR)

( * ) Notice: Subject to any disclaimer, the term of this patent is extended or adjusted under 35 U.S.C. 154(b) by 0 days.

(21) Appl. No.: 14/660,566

(22) Filed: Mar. 17, 2015

(65) Prior Publication Data

US 2016/0260234 A1 Sep. 8, 2016

(30) Foreign Application Priority Data

Mar. 2, 2015 (KR) .......................... 10-2015-0028995

(51) Int. Cl.
*G06T 11/20* (2006.01)
*G06T 11/60* (2006.01)

(52) U.S. Cl.
CPC .............. *G06T 11/206* (2013.01); *G06T 11/60* (2013.01)

(58) Field of Classification Search
CPC ..................... G06T 11/206; G06F 17/2223
See application file for complete search history.

(56) References Cited

U.S. PATENT DOCUMENTS

| | | | | |
|---|---|---|---|---|
| 6,714,199 B1* | 3/2004 | Beaman | ............... | G06F 17/214 345/468 |
| 6,760,029 B1* | 7/2004 | Phinney | ................ | G06K 15/02 345/468 |
| 2012/0254786 A1* | 10/2012 | Colley | .................. | G06F 3/0233 715/773 |
| 2014/0285495 A1* | 9/2014 | Kang | .................. | G06F 17/2223 345/471 |

FOREIGN PATENT DOCUMENTS

| | | | |
|---|---|---|---|
| IL | WO 9836630 A2 * | 8/1998 | .......... G06F 17/214 |
| JP | 06-096056 A | 4/1994 | |
| KR | 10-2000-0036448 A | 7/2000 | |
| KR | 2002-0007558 A | 1/2002 | |
| KR | 10-1344457 B1 | 12/2013 | |

\* cited by examiner

*Primary Examiner* — Xiao Wu
*Assistant Examiner* — Mohammad H Akhavannik
(74) *Attorney, Agent, or Firm* — Hauptman Ham, LLP

(57) ABSTRACT

Disclosed are a system and a method for generating multiple a master glyph. The system for generating a multiple master glyph according to the present invention includes: a user terminal receiving a grapheme from a user and converting the grapheme into a grapheme image; a server extracting vector data of the grapheme image; and an editor generating a basic grapheme glyph and an extended grapheme glyph and grouping the basic grapheme glyph and the extended grapheme glyph into a MMG.

18 Claims, 8 Drawing Sheets

SYSTEM AND METHOD FOR GENERATING MULTIPLE MASTER GLYPH

CROSS-REFERENCE TO RELATED APPLICATIONS

This application claims priority to and the benefit of Korean Patent Application No. 10-2015-0028995 filed in the Korean Intellectual Property Office on Mar. 2, 2015, the entire contents of which are incorporated herein by reference.

TECHNICAL FIELD

The present invention relates to a system and a method for generating a multiple master glyph, and more particularly, to a system and a method for generating a multiple master glyph, which receive a grapheme from a user and convert the received constants and vowels (received grapheme) into a grapheme image, extract outline vector data and center line vector data of the converted grapheme image to generate a basic grapheme glyph and an extended grapheme glyph of which at least one of a horizontal length and a vertical length is extended compared with a basic grapheme glyph and thereafter, group the generated basic grapheme glyph and extended grapheme glyph into one multiple master glyph (MMG).

BACKGROUND ART

Fonts as a kind of text library storing predesigned letters having various styles and sizes include all characters, figures, and special symbols required for typesetting.

Formats of the characters need to be expressed as data of 0 and 1 so as to display or print the fonts through a computer. When the fonts may be expressed as digital data constituted by 0 and 1, the computer may store, process, or output the digital data to an external output device. Therefore, the fonts may be a set of character-shaped data expressed in a digital format.

In the related art, the fonts had been primarily used in a special use field of publication and document writing such as desktop publishing (DTP) or computerized typesetting system (CTS). However, with the development of information and communication technology, the fonts have also been increasingly used under a personal environment and an importance thereof has increased even under a web environment or mobile environment.

However, since the fonts are prepared and provided through long-term manual work of a special font designer even up to now, the type of computer fonts which are actually usable is not diversified.

In recent years, a demand of users for preparing prepare their own fonts including their personalities in addition to previously prepared fonts has increased, but it is impossible for a person to directly prepare several kinds of grapheme glyphs required for preparing the fonts and an MMG acquired by extending at least one of the horizontal length and the vertical lengthy of the glyph for each grapheme.

Further, an MMG preparing technique in the related art has a problem that the MMG is generated just by extending the glyph in a horizontal direction or a vertical direction without considering the thickness of the glyph, and as a result, the thickness of the glyph cannot be uniformly generated.

Therefore, in order to solve the aforementioned problems, the present inventor has invented a system and a method for generating a multiple master glyph, which receive a grapheme from a user and convert the received grapheme into a grapheme image, extract outline vector data and center line vector data of the converted grapheme image to generate a basic grapheme glyph and an extended grapheme glyph of which at least one of a horizontal length and a vertical length is extended compared with the basic grapheme glyph and thereafter, group the generated basic grapheme glyphs and extended grapheme glyph into one multiple master glyph (MMG) to generate a user's handwritten letter as the glyph and prevent the thickness of the extended glyph from being nonuniformly extended in any one length direction and generate the extended glyph having the same thickness as the user's handwritten letter.

Technical Solution

A system for generating a multiple master glyph according to the present invention includes: a user terminal receiving a grapheme from a user and converting the grapheme into a grapheme image; a server extracting outline vector data and center line vector data of the grapheme image; and an editor generating a basic grapheme glyph and an extended grapheme glyph of which at least one of a horizontal length and a vertical length is extended compared with the basic grapheme glyph by using the outline vector data and the center line vector data and grouping the basic grapheme glyph and the extended grapheme glyph into a multiple master glyph (MMG).

the user terminal may include a display unit displaying a grapheme name to be input by the user, an input unit receiving the grapheme from the user through handwriting, and a conversion unit converting the received grapheme into the grapheme image.

the server may include an extraction unit extracting the outline vector data and the center line vector data by vectorizing an outline and a center line of the grapheme image, a grapheme data generation unit generating grapheme data including the outline vector data, the center line vector data, the number of outline points, the number of center line points, a grapheme name, a grapheme type, and a grapheme identification code, and a storage unit storing the grapheme data.

the server may further include a comparison unit comparing at least one grapheme identification code stored in the storage unit and a predetermined grapheme identification code list and when the grapheme identification code which is not stored in the storage unit is searched in the predetermined grapheme identification code list, generating a grapheme input request signal for requesting an input grapheme of the searched grapheme identification code.

the comparison unit may generate a grapheme data transmission signal when all grapheme identification codes of the predetermined grapheme identification code list are stored in the storage unit.

the editor may include a validation unit comparing, when the grapheme data is received from the server, the grapheme identification code of the received grapheme data and the predetermined grapheme identification code list to validate whether receiving the grapheme data is completed.

the editor may include a calculation unit calculating a grapheme thickness by calculating a distance between the outline points.

the editor may further include a layer generation unit storing the center line vector data in each of a basic layer and first to third extended layers, and an extension unit extending the center line vector data of the first extended layer in a horizontal direction, extending the center line vector data of the second extended layer in a vertical direction, and extending the center line vector data of the third extended layer in the horizontal direction and the vertical direction.

the editor may generate a basic grapheme glyph by using the outline vector data, and may further include a glyph generation unit generating first to third outline vector data so that intervals among outline points are the same as the grapheme thickness based on the center line vector data of first to third extended layers, respectively to generate the first to third extended grapheme glyphs.

the editor may further include a grouping unit grouping the basic grapheme glyph, and the first to third extended grapheme glyphs into the MMG.

the editor may further include a verification unit verifying grapheme data which is not grouped into the MMG among the received grapheme data.

A method for generating a multiple master glyph according to the present invention, the method comprising: receiving, by a user terminal, a grapheme from a user and converting the grapheme into a grapheme image; extracting, by a server, outline vector data and center line vector data of the grapheme image; generating, by an editor, a basic grapheme glyph and an extended grapheme glyph of which at least one of a horizontal length and a vertical length is extended compared with the basic grapheme glyph by using the outline vector data and the center line vector data; and grouping, by the editor, the basic grapheme glyph, and the extended grapheme glyphs into one MMG.

the converting of the grapheme into the grapheme image may include displaying, by a display unit, a grapheme name to be input by the user, receiving, by an input unit, the grapheme from the user through handwriting, and converting, by a conversion unit, the received grapheme into the grapheme image.

the extracting of, by the server, the outline vector data and the center line vector data of the grapheme image may include extracting, by an extraction unit, the outline vector data and the center line vector data by vectorizing an outline and a center line of the grapheme image, generating, by a grapheme data generation unit, grapheme data including the outline vector data, the center line vector data, the number of outline points, the number of center line points, a grapheme name, a grapheme type, and a grapheme identification code, and storing, by a storage unit, the grapheme data.

the extracting of, by the server, the outline vector data and the center line vector data of the grapheme image may further include comparing, by a comparison unit, at least one grapheme identification code stored in the storage unit and a predetermined grapheme identification code list and when the grapheme identification code which is not stored in the storage unit is searched in the predetermined grapheme identification code list, generating a grapheme input request signal for requesting an input grapheme of the searched grapheme identification code.

the extracting of the outline vector data and the center line vector data of the grapheme image may further include generating, by the comparison unit, a grapheme data transmission signal when all grapheme identification codes of the predetermined grapheme identification code list are stored in the storage unit.

the generating of the basic grapheme glyph and the extended grapheme glyph may include comparing, by a validation unit, when the grapheme data is received from the server, the grapheme identification code of the received grapheme data and the predetermined grapheme identification code list to validate whether receiving the grapheme data is completed.

the generating of the basic grapheme glyph and the extended grapheme glyph may include calculating, by a calculation unit, a grapheme thickness by calculating a distance between the outline points.

the generating of the basic grapheme glyph and the extended grapheme glyph may further include storing, by a layer generation unit, the center line vector data in each of a basic layer and first to third extended layers, and extending, by an extension unit, the center line vector data of the first extended layer in a horizontal direction, extending the center line vector data of the second extended layer in a vertical direction, and extending the center line vector data of the third extended layer in the horizontal direction and the vertical direction.

the generating of the basic grapheme glyph and the extended grapheme glyph may further include generating, by a glyph generation unit, the basic grapheme glyph by using the outline vector data, and first to third outline vector data so that intervals among outline points are the same as the grapheme thickness based on the center line vector data of first to third extended layers, respectively to generate first to third extended grapheme glyphs.

the grouping into the MMG may include grouping, by a grouping unit, the basic grapheme glyph and the first to third extended grapheme glyphs into the MMG.

the grouping into the MMG may further include verifying, by a verification unit, grapheme data which is not grouped into the MMG among the received grapheme data.

SUMMARY OF THE INVENTION

The present invention has been made in an effort to provide a system and a method for generating a multiple master glyph, which generate a basic grapheme glyph and an extended grapheme glyph of which at least one of horizontal lengths and vertical lengths is extended compared with the basic grapheme glyph from a grapheme received from a user and group the generated basic grapheme glyph and extended grapheme glyph into one multiple master glyph (MMG) to more effectively generate a user's handwritten letter as the MMG.

According to exemplary embodiments of the present invention, a system and a method for generating a multiple master glyph convert the grapheme received from the user into a grapheme image and generate a basic grapheme glyph and an extended grapheme glyph from the grapheme image to generate a user's handwritten letter as a glyph, thereby easily making a user's own handwriting type into the font. Further, the system and the method for generating multiple master glyphs generate a basic grapheme glyph and an extended grapheme glyph of which at least one of a horizontal length and a vertical length is extended compared with the basic grapheme glyph by using outline vector data and center line vector data and group the basic grapheme glyph and the extended grapheme glyph into one multiple master glyph (MMG) to prevent the thickness of the extended glyph from being extended in any one length direction and generate the extended glyph having the same thickness as the user's handwritten letter.

DETAILED DESCRIPTION

Hereinafter, the present invention will be described in detail with reference to the accompanying drawings. Herein, a repeated description and detailed descriptions of well-known functions or configurations in order not to unnecessarily obscure the spirit of the present invention will be ruled out. Exemplary embodiments of the present invention are provided so that this disclosure will be thorough and complete, and will fully convey the concept of the present invention to those skilled in the art. Therefore, in the accompanying drawings of the present invention, shapes and dimensions of components may be exaggerated for clarity.

In the specification, unless explicitly described to the contrary, the word "comprise" and variations such as "comprises" or "comprising", will be understood to imply the inclusion of stated elements but not the exclusion of any other elements.

Further, the term "unit" disclosed in the specification means a unit that processes at least one function or operation and this may be implemented by hardware or software or a combination of hardware and software.

Figure 1:
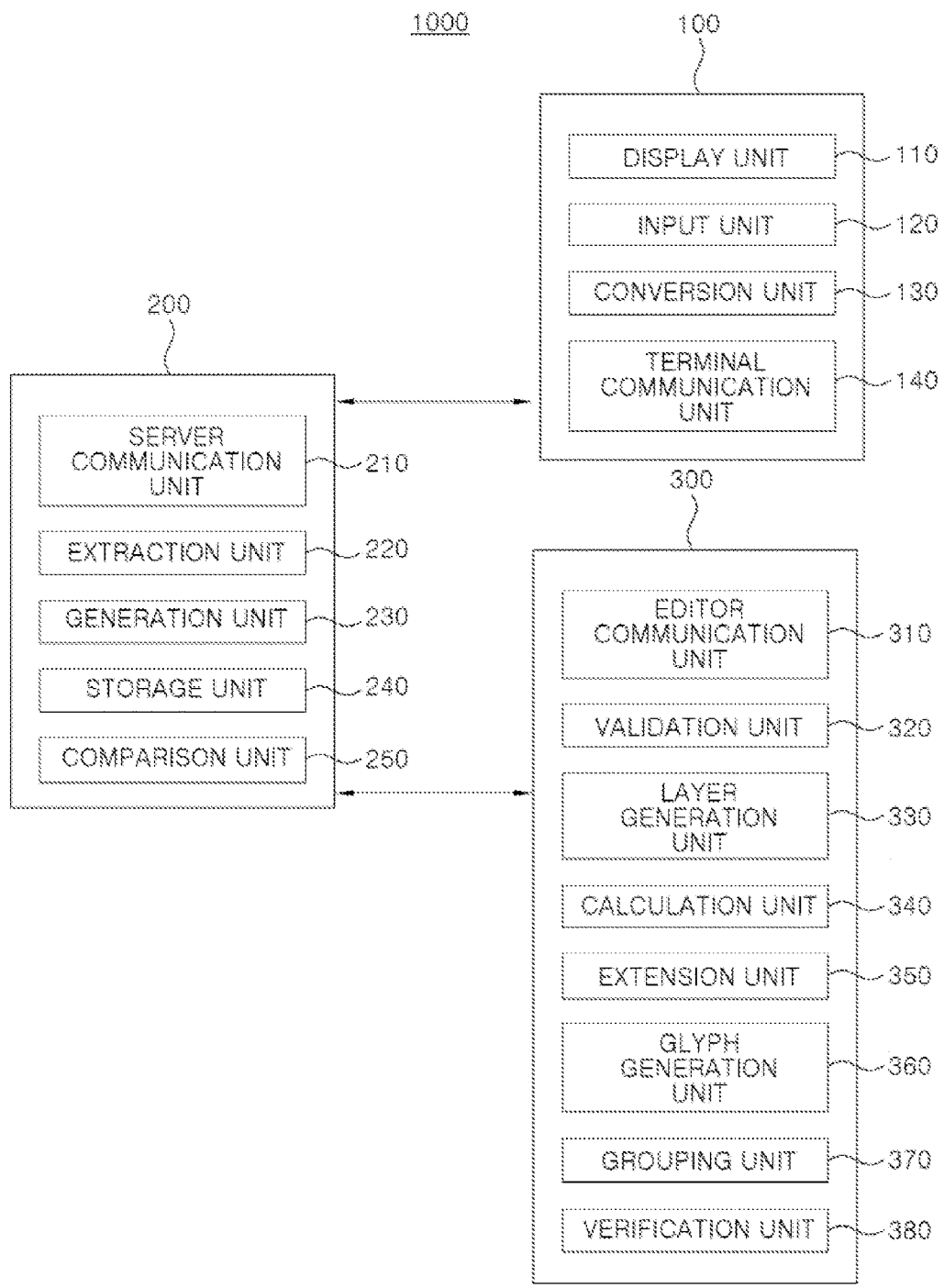
FIG. 1 is a diagram schematically illustrating a configuration of a system for generating a multiple master glyph according to an exemplary embodiment of the present invention.
Figure 2:
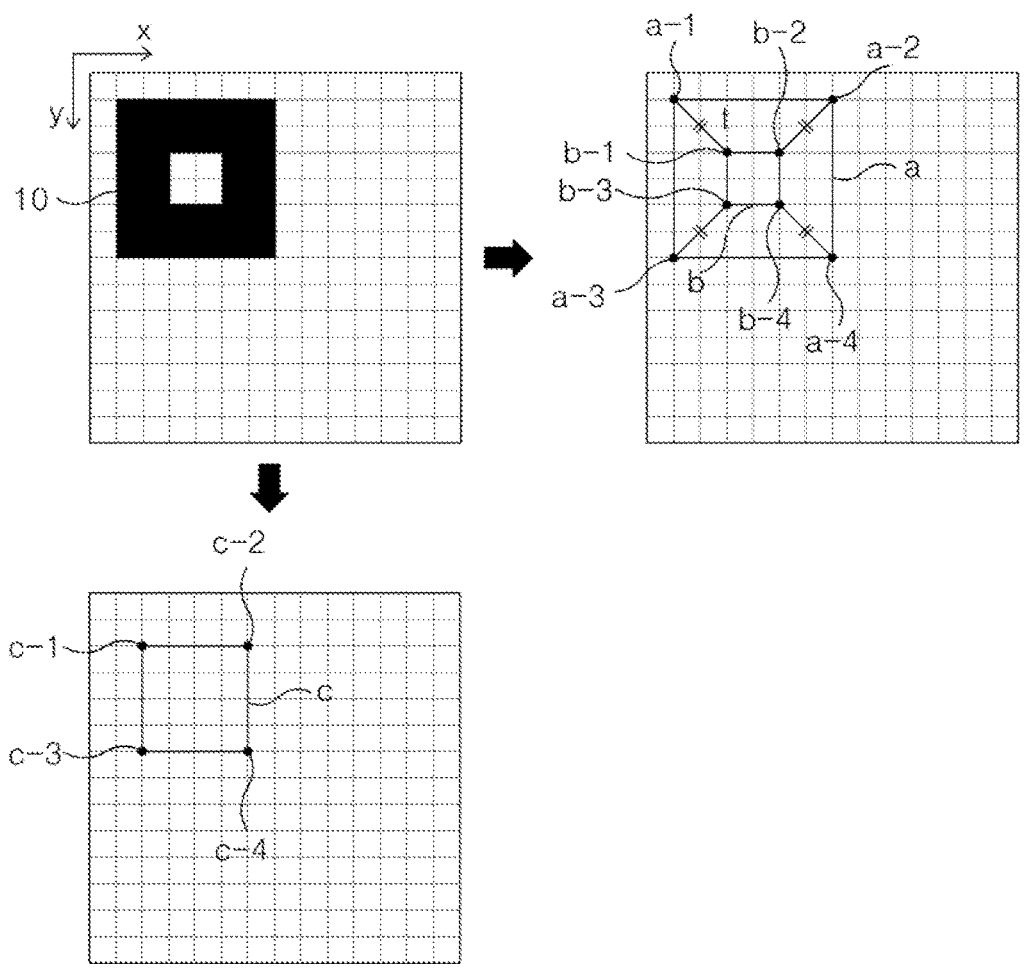
FIG. 2 is a diagram illustrating one example of a grapheme image and vector data converted through the system for generating a multiple master glyph according to the exemplary embodiment of the present invention.
Figure 3:
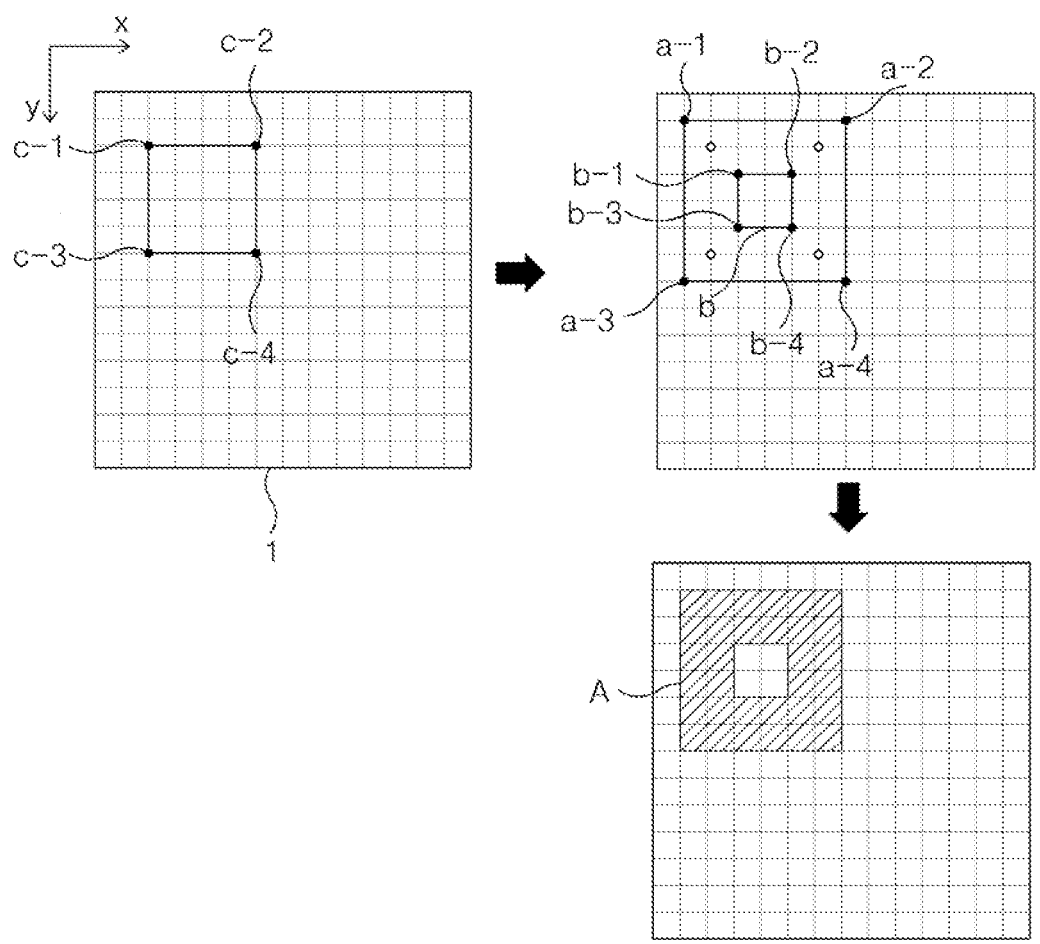
FIGS. 3 to 6 are diagrams illustrating examples of a basic layer and first to third extended layers generated through the system for generating a multiple master glyph according to the exemplary embodiment of the present invention.
Figure 4:
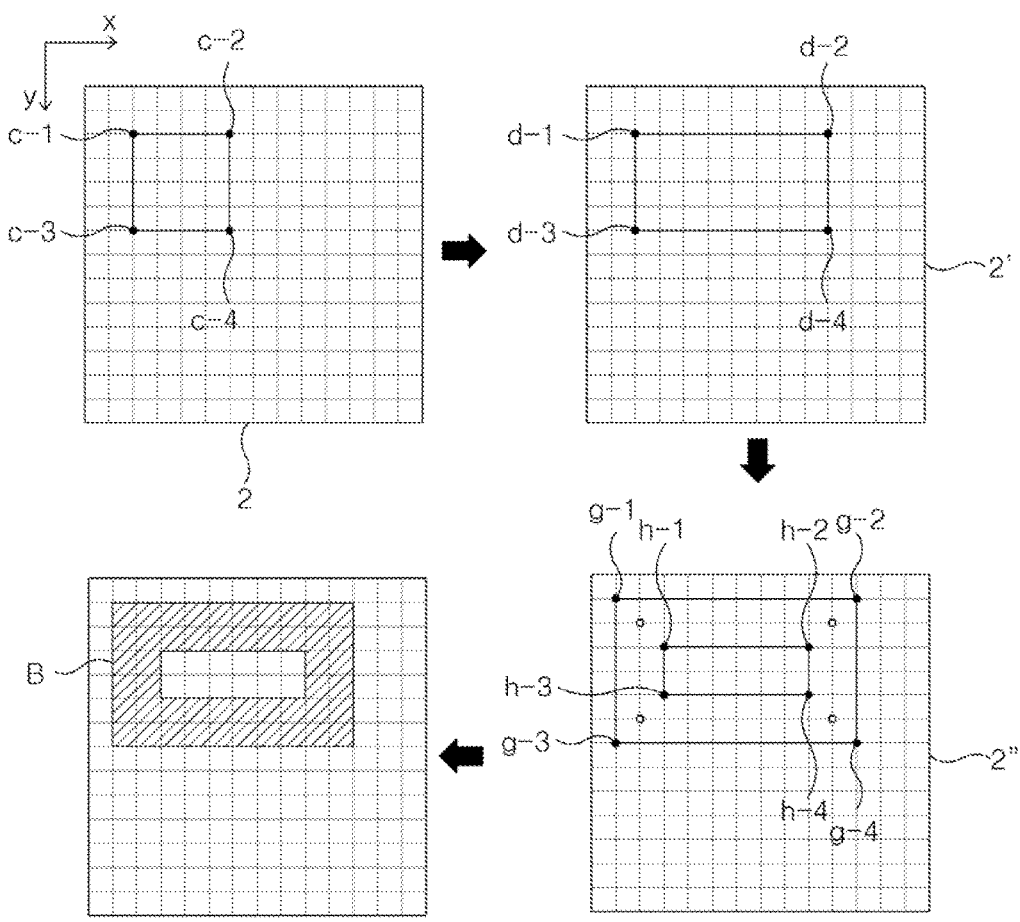
Figure 5:
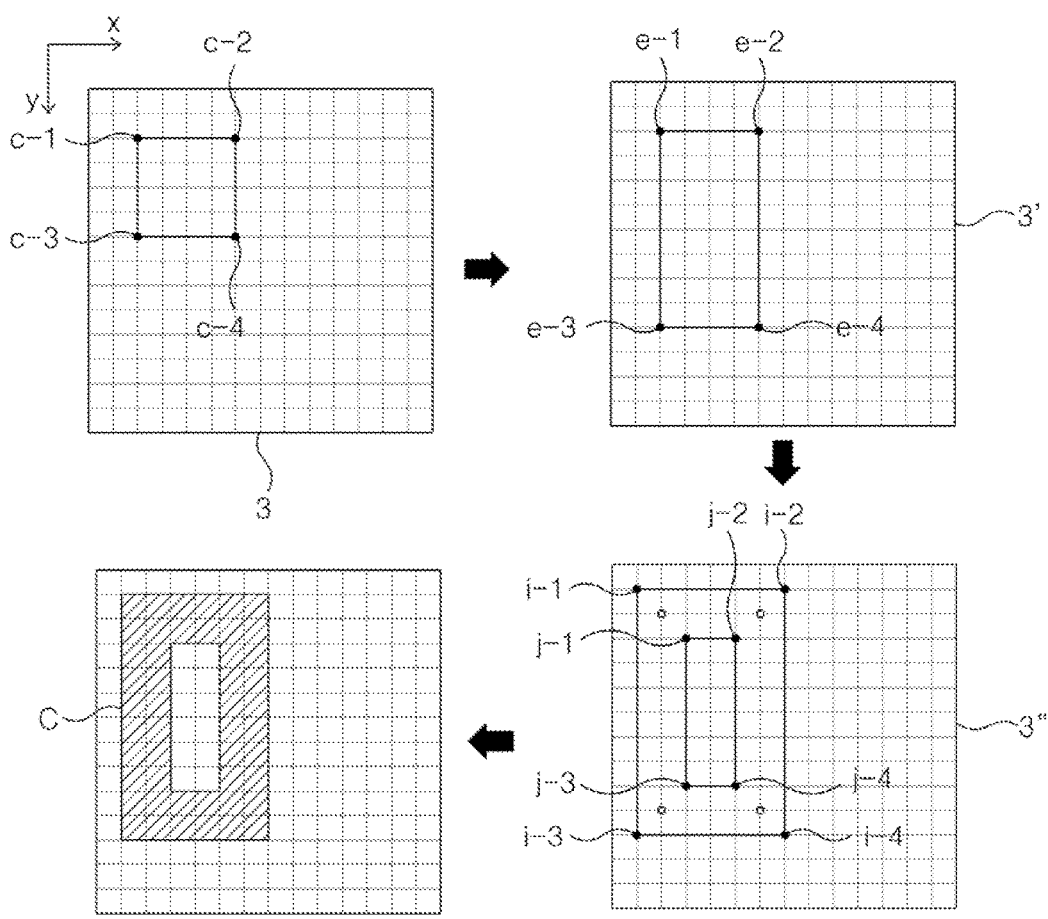
Figure 6:
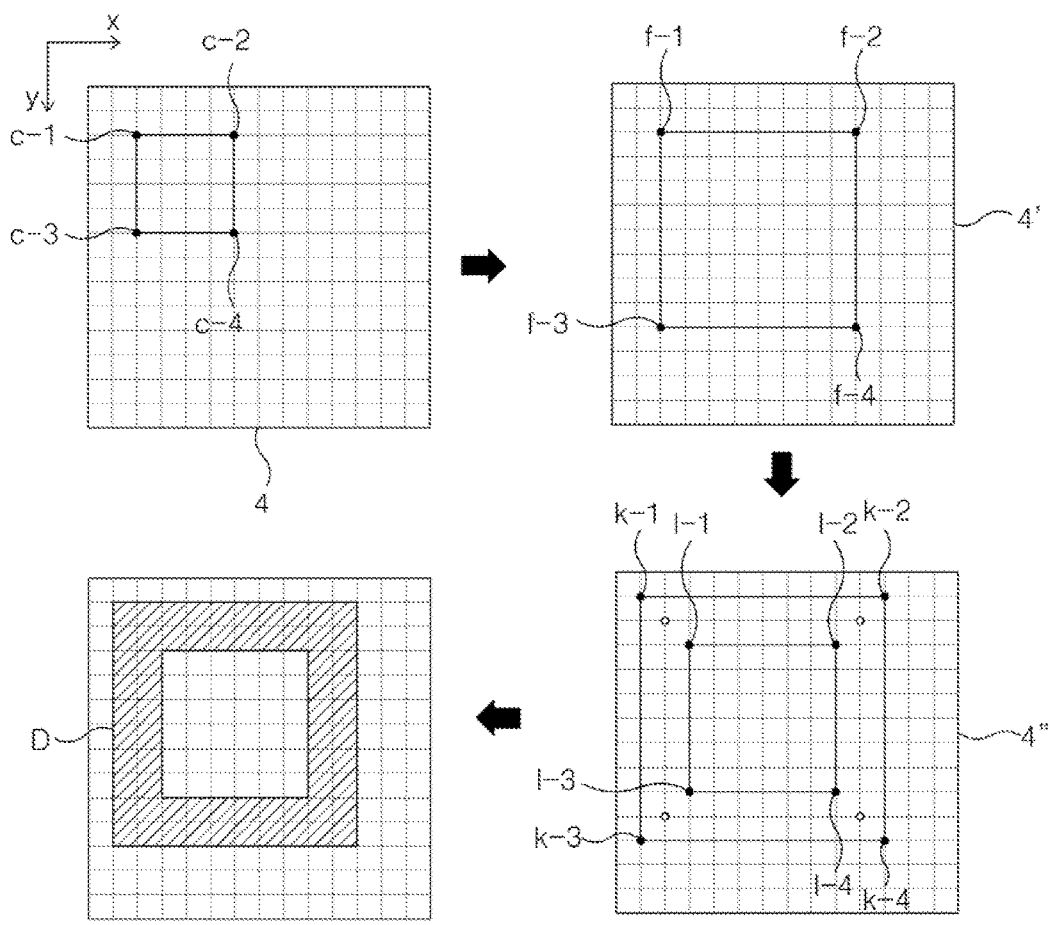
Figure 7:
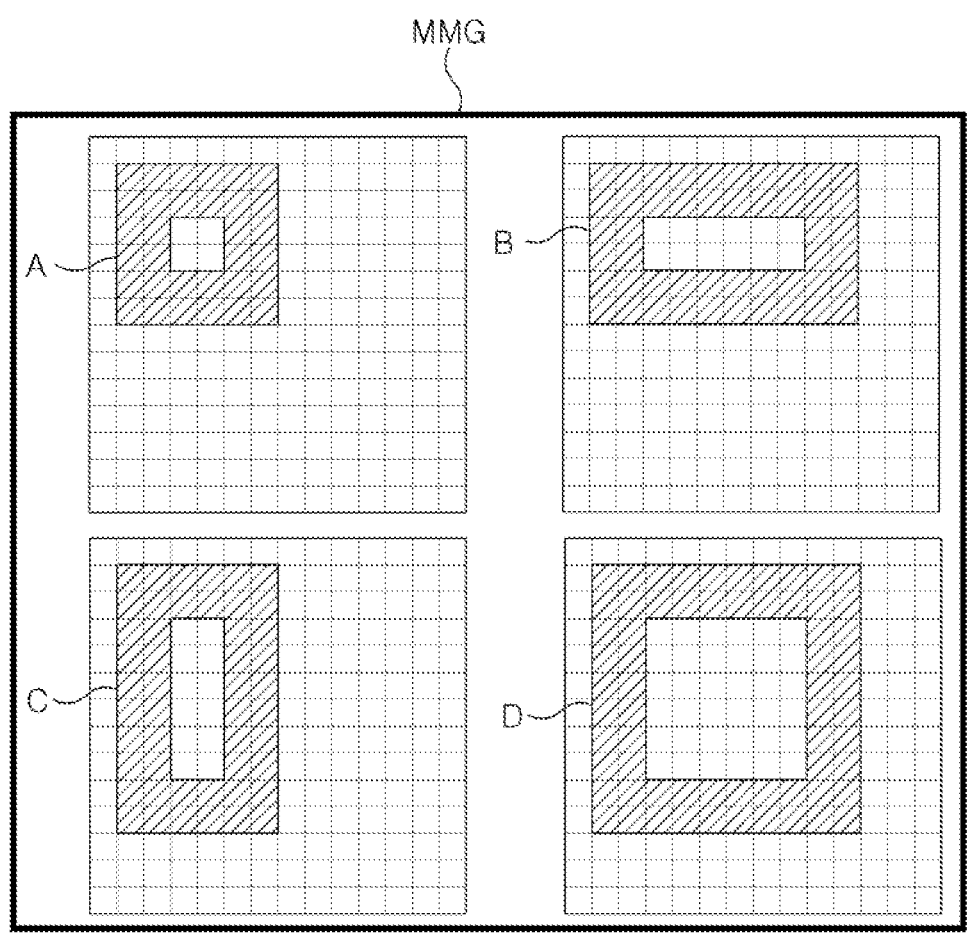
FIG. 7 is a diagram illustrating one example of an MMG generated through the system for generating a multiple master glyph according to the exemplary embodiment of the present invention.

FIG. 1 is a diagram schematically illustrating a configuration of a system for generating a multiple master glyph according to an exemplary embodiment of the present invention. FIG. 2 is a diagram illustrating one example of a grapheme image and vector data converted through the system for generating a multiple master glyph according to the exemplary embodiment of the present invention. FIGS. 3 to 6 are diagrams illustrating examples of a basic layer and first to third extended layers generated through the system for generating a multiple master glyph according to the exemplary embodiment of the present invention. FIG. 7 is a diagram illustrating one example of an MMG generated through the system for generating a multiple master glyph according to the exemplary embodiment of the present invention.

Referring to FIG. 1, the multiple master glyph generating system 1000 according to the exemplary embodiment of the present invention may be configured to include a user terminal 100, a server 200, and an editor 300.

In more detail, the user terminal 100 may include a display unit 110, an input unit 120, a conversion unit 130, and a terminal communication unit 140, the server 200 may include a server communication unit 210, an extraction unit 220, a generation unit 230, a storage unit 240, and a comparison unit 250, and an editor 300 may include an editor communication unit 310, a validation unit 320, a layer generation unit 330, a calculation unit 340, an extension unit 350, a glyph generation unit 360, a grouping unit 370, and a verification unit 380.

Meanwhile, the configuration of the multiple master glyph generating system 1000 illustrated in FIG. 1 is according to the exemplary embodiment and all blocks illustrated in FIG. 1 are not requisite components and it should be noted that in another exemplary embodiment, some blocks may be added, changed, or deleted.

The user terminal 100 may serve to receive a grapheme from a user and convert the received grapheme into a grapheme image 10, and transmit the grapheme image 10 to the server 200 to be described below.

In the exemplary embodiment, the user terminal 100 may be at least one of a personal digital assistant (PDA), a tablet computer, a personal computer (PC), a laptop computer, and a smart phone.

The display unit 110 may serve to display a grapheme name so as for the user to accurately input a grapheme required to generate an MMG. The user verifies the grapheme name displayed in the display unit 110 to input a grapheme corresponding to the grapheme name.

In the exemplary embodiment, the display unit 110 does not just mean a display but may have a form in which the display and a controller controlling a display of the corresponding display are joined.

The input unit 120 may serve to receive the grapheme from the user by handwriting. Further, the input unit 120 may receive an MMG project name.

The input unit 120 may include a touch panel recognizing a touch of the user in order to receive a handwritten letter of the user and a digitizer converting reading a coordinate which is analog input data into digital data, and may include a keyboard for receiving the MMG project name.

The conversion unit 130 may serve to convert the grapheme input through the input unit 120 into the grapheme image 10. The conversion unit 130 is implemented as a general-purpose web-browser to convert the input the grapheme without a separate program installing process in the user terminal 100 into the grapheme image 10.

The terminal communication unit 140 may serve to transmit the grapheme image 10 converted by the conversion unit 130 to the server communication unit 210 of the server 200 by using at least one of Ethernet communication, wireless fidelity (Wi-Fi) communication, code division multiple access (CDMA) communication, and long term evolution (LTE) communication. Further, the terminal communication unit 140 may receive a control signal such as a grapheme input request signal from the server 200 in addition to transmission of the grapheme image 10.

The server 200 may serve to extract outline vector data and center line vector data of the grapheme image 10.

To this end, the server communication unit 210 may serve to receive the grapheme image 10 from the terminal communication unit 140 of the user terminal 100. Further, the server communication unit 210 may transmit and receive the data and the control signal to and from the editor communication unit 310 of the editor 300 to be described below.

In this case, the server communication unit 210 may communicate with the server communication unit 210 and the editor communication unit 310 by using at least one of the Ethernet communication, Wi-Fi communication, the CDMA communication, and the LTE communication.

The extraction unit 220 may serve to extract the outline vector data and center line vector data by vectorizing outlines a and b and a center line c of the received grapheme image 10.

As illustrated in FIG. 2, when the input unit 110 of the user terminal 100 receives a grapheme (丁) from the user and converts the received grapheme into the grapheme image 10 and transmits the grapheme image 10 through the terminal communication unit 140, the extraction unit 220 may extract coordinates of center line points c-1, c-2, c-3, and c-4 constituted by crosspoints and an inflection point of coordinates of outline points a-1, a-2, a-3, a-4, b-1, b-2, b-3, and b-4 and constituted by crosspoints and inflection points of the outlines a and b and the center line in the grapheme image 10.

Herein, the outline may be a line that links inner and outer peripheries of the grapheme image and the center line may be a line that links centers of an outer outline and an inner outline of the grapheme image.

The generation unit 230 may serve to generate grapheme data including information on the grapheme. In more detail, the generation unit 230 may generate the grapheme data including the outline vector data, the center line vector data, the number of outline points, the number of center line points, a grapheme name, a grapheme type, and a grapheme identification code.

Herein, the grapheme type may be changed to correspond to a language kind of the input grapheme. For example, when the language of the grapheme is Korean, the grapheme type may be an initial consonant, a neutral consonant, and a final consonant.

Further, the grapheme identification code may be a code acquired by combining at least one of figures, symbols, and letters assigned for each grapheme in order to identify the input grapheme.

The storage unit 240 may serve to store the generated grapheme data in the server 200. To this end, the storage unit 240 may include at least one of a flash memory, a static random access memory (SRAM), an electrically erasable and programmable read only memory (EEPROM), and an erasable and programmable read only memory (EPROM).

The comparison unit 250 may serve to compare at least one grapheme identification code stored in the storage unit 240 and a predetermined grapheme identification code list.

Herein, the predetermined grapheme identification code list may be grapheme identification codes of graphemes which are particularly required when fonts are prepared by using the MMG generated in the multiple master glyph generating system 1000.

When the grapheme identification code which is not stored in the storage unit 240 is searched in the predetermined grapheme identification code list according to the comparison result, the comparison unit 250 may generate a grapheme input request signal for requesting an input of the grapheme corresponding to the searched grapheme identification code.

In this case, the server communication unit 210 may transmit the grapheme input request signal to the terminal communication unit 140 of the user terminal 100 and the user terminal 100 that receives the grapheme input request signal displays the grapheme name of the grapheme data which is not stored in the storage unit 240 on the display unit 110 to allow the input unit 120 to receive all graphemes included in the predetermined grapheme identification code list from the user.

On the contrary, according to the comparison result of the comparison unit 250, when all of the grapheme identification codes of the predetermined grapheme identification code list are stored in the storage unit 240, the server communication unit 210 may generate a grapheme data transmission signal for transmitting the grapheme data stored in the storage unit 240 to the editor 300.

In this case, the server communication unit 210 may transmit the grapheme data stored in the storage unit 240 to the editor communication unit 310 of the editor 300 when the grapheme data transmission signal is generated.

The editor 300 may serve to generate a basic grapheme glyph and an extended grapheme glyph of which at least one of a horizontal length and a vertical length is extended compared with the basic grapheme glyph by using the outline vector data and the center line vector data.

Further, the editor 300 may group the generated basic grapheme glyph and the extended grapheme glyph into one MMG.

To this end, the editor communication unit 310 may serve to receive the grapheme data from the server communication unit 210. In this case, the editor communication unit 310 may communicate with the server communication unit 210 and the editor communication unit 310 by using at least one of the Ethernet communication, the Wi-Fi communication, the CDMA communication, and the LTE communication.

The validation unit 320 may serve to compare the grapheme identification code of at least one received grapheme data and the predetermined grapheme identification code list to validate whether receiving the grapheme data is completed.

According to the validation result of the validation unit 320, when the grapheme identification code which is not received is searched in the predetermined grapheme identification code list, a grapheme data retransmission signal for requesting retransmission of the grapheme data corresponding to the searched grapheme identification code may be generated.

In this case, the editor communication unit 310 may transmit the grapheme data retransmission signal to the server communication unit 210 and the server communication unit 210 that receives the grapheme data retransmission signal may retransmit the corresponding grapheme data. Therefore, the editor 300 may receive all grapheme data of the grapheme particularly required to prepare the fonts by using the MMG without omission.

On the contrary, according to the validation result of the validation unit 320, when the calculation unit 340 receives the grapheme data corresponding to all of the grapheme identification codes of the predetermined grapheme identification code list, the calculation unit 340 may serve to calculate a grapheme thickness t by calculating a distance between the outline points a-1 and b-1 of the outline vector data included in the grapheme data.

In more detail, the calculation unit 340 may calculate the distance between two outline points a-1 and b-1 by using the coordinates of two outline points a-1 and b-1 corresponding to each other between the outer outline a and the inner outline b and calculate the calculated distance as the grapheme thickness t.

For example, the calculation unit 340 may calculate $2\sqrt{2}$ which is the distance between two outline points a-1 and b-1 calculated from the coordinates (1, 1) and (3, 3) of two outline points a-1 and b-1 illustrated in FIG. 2 as the grapheme thickness t.

The layer generation unit 330 may serve to store the center line vector data of the grapheme data received by each of the basic layer 1 and the first to third extended layers 2, 3, and 4.

As illustrated in FIGS. 3 to 6, when the layer generation unit 330 stores the center line vector data in each of a total of four layers 1, 2, 3, and 4, center line points c-1, c-2, c-3, and c-4 may be stored in the respective layers 1, 2, 3, and 4 to correspond to coordinates (2,2), (6,2), (2,6), and (6,6), respectively.

The extension unit 350 may extend the center line vector data stored in the first extended layer 2 with a predetermined magnification in a horizontal direction, extend the center line vector data stored in the second extended layer 3 with a predetermined magnification in a vertical direction, and extend the center line vector data stored in the third extended layer 4 with a predetermined magnification in the horizontal direction and the vertical direction.

In the exemplary embodiment, the first to third extended layers 2, 3, and 4 may be a perpendicular coordinate having an upper right edge as an origin. As a result, the extension unit 350 may extend the center line vector data stored in the first to third extended layers 2, 3, and 4 based on the aforementioned origin.

For example, when the extension unit 350 extends the center line vector data stored in the first to third extended layers 2, 3, and 4 with a twice magnification, in a first extended layer 2', intervals among center line points d-1, d-2, d-3, and d-4 are extended in the horizontal direction with the twice magnification, and as a result, coordinates of the center line points d-1, d-2, d-3, and d-4 may be changed to (2,2), (10,2), (2,6), and (10,6), respectively, in a second extended layer 3', intervals among center line points e-1, e-2, e-3, and e-4 are extended in the vertical direction with the twice magnification, and as a result, coordinates of the center line points e-1, e-2, e-3, and e-4 may be changed to (2,2), (6,2), (2,10), and (6,10), respectively, and in a third extended layer 4', intervals among the center line points f-1, f-2, f-3, and f-4 are extended with the twice magnification in the horizontal direction and the vertical direction, and as a result, coordinates of the center line points f-1, f-2, f-3, and f-4 may be changed to (2,2), (10,2), (2,10), and (10,10), respectively.

The glyph generation unit 360 may serve to generate the basic grapheme glyph A by using the received outline vector data. Further, the glyph generation unit 360 may serve to generate first to third outline vector data so that intervals among outline points are the same as the grapheme thickness t based on the center line vector data of first to third extended layers 2", 3", and 4", respectively to generate first to third extended grapheme glyphs B, C, and D.

For example, the glyph generation unit 360 may generate the basic grapheme glyph A by using the outline vector data including outer outline points a-1, a-2, a-3, and a-4 of which the coordinates are (1,1), (7,1), (1,7), and (7,7) and inner outline points b-1, b-2, b-3, and b-4 of which the coordinates are (3,3), (5,3), (3,5), and (5,5). In this case, the outline vector data used to generate the basic grapheme glyph A may be the outline vector data of the grapheme data received from the server communication unit 210 of the server 200.

Meanwhile, when the glyph generation unit 360 generates the first to third outline vector data having the grapheme thickness which is the same as $2\sqrt{2}$ which is the grapheme thickness calculated through the calculation unit 340, first outline vector data may be generated in the first extended layer 2", which includes outer outline points g-1, g-2, g-3, and g-4 of which the coordinates are (1,1), (11,1), (1,7), and (11,7) and inner outline points h-1, h-2, h-3, and h-4 of which the coordinates are (3,3), (9,3), (3,5), and (9,7).

Further, second outline vector data may be generated in the second extended layer 3", which includes outer outline points i-1, i-2, i-3, and i-4 of which the coordinates are (1,1), (7,1), (1,11), and (7,11) and the inner outline points j-1, j-2, j-3, and j-4 of which the coordinates are (3,3), (5,3), (3,9), and (7,9), and third outline vector data may be generated in the third extended layer 4", which includes outer outline points k-1, k-2, k-3, and k-4 of which the coordinates are (1,1), (11,1), (1,11), and (11,11) and the inner outline points l-1, l-2, l-3, and l-4 of which the coordinates are (3,3), (9,3), (3,9), and (9,9).

Thereafter, the glyph generation unit 360 may generate the first to third outline vector data as the first to third extended grapheme glyphs B, C, and D, respectively.

As a result, the basic grapheme glyph A, and the first extended grapheme glyph B extended in the horizontal direction, the second extended grapheme glyph C extended in the vertical direction, and the third extended grapheme glyph D extended in the horizontal and vertical directions compared with the basic grapheme glyph A may be generated from the glyph generation unit 360.

The grapheme thicknesses of the basic grapheme glyph A, and the first to third extended grapheme glyphs B, C, and D are not nonuniformly extended in any one direction and may be generated with the same thickness as that of the grapheme received from the user.

The grouping unit 370 may serve to group the basic grapheme glyph A, and the first to third extended grapheme glyphs B, C, and D into one MMG. Therefore, as illustrated in FIG. 7, the grouped MMG may include a total of four grapheme glyphs.

In this case, the verification unit 380 compares the number of grouped MMGs and the number of grapheme data received from the server 200 and according to the comparison result, when the number of grouped MMGs is less than the number of received grapheme data, the verification unit 380 may generate a revalidation request signal. On the contrary, when the number of grouped MMGs is the same as the number of received grapheme data, the multiple master glyph generating system 1000 may end.

In the exemplary embodiment, the validation unit 320 may revalidate transmission completion of the grapheme data when the revalidation request signal is generated.

Figure 8:
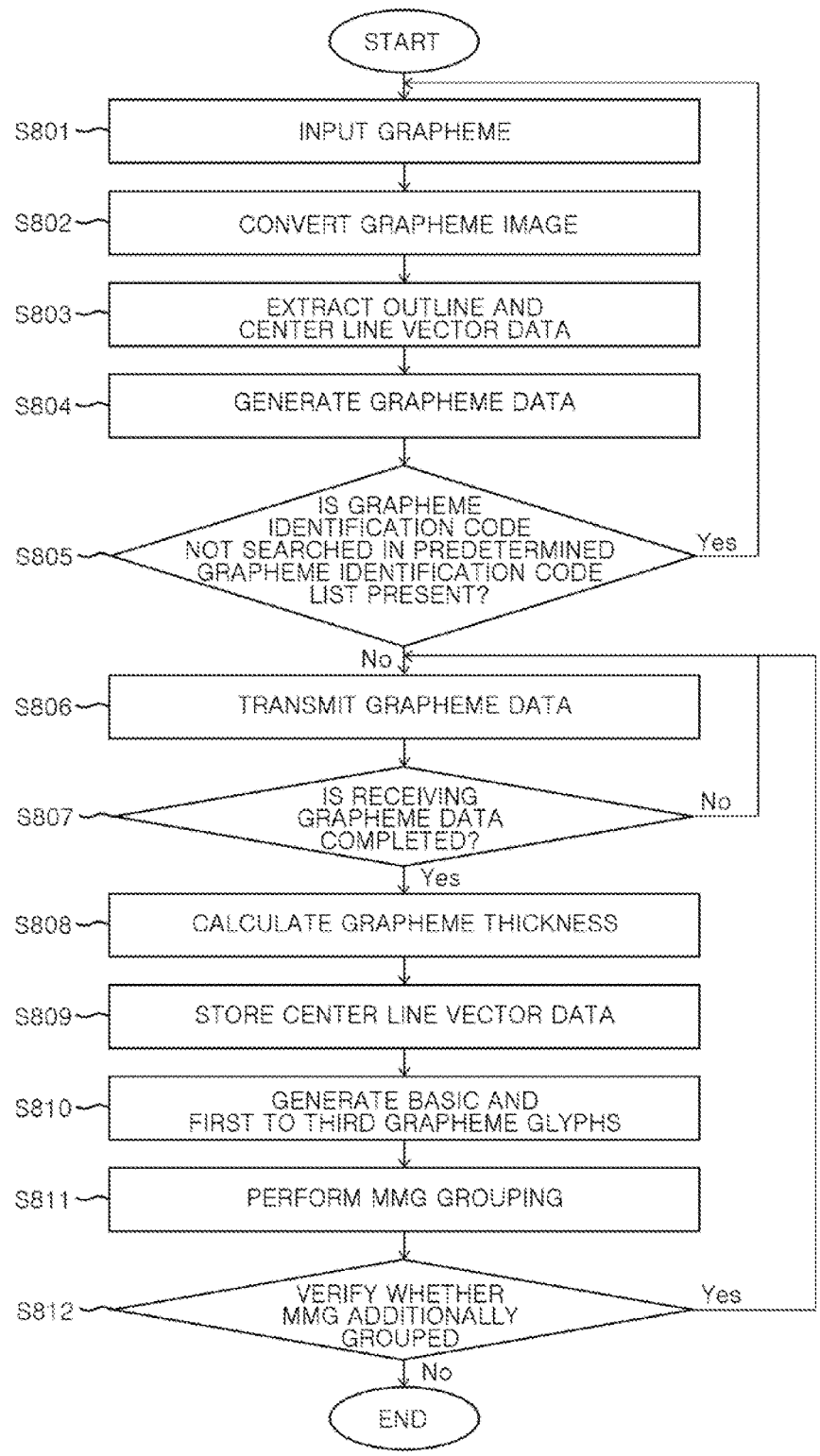
FIG. 8 is a flowchart for describing a method for generating a multiple master glyph according to another exemplary embodiment of the present invention.

FIG. 8 is a flowchart for describing a method for generating a multiple master glyph according to another exemplary embodiment of the present invention.

Referring to FIG. 8, first, when the multiple master glyph generating method according to the exemplary embodiment of the present invention starts, an input unit of a user terminal receives a grapheme from a user through handwriting (S801). In this case, the user verifies a grapheme name output to a display unit of the user terminal and inputs the grapheme corresponding thereto. Further, the input unit of the user terminal receives an MMG project name from the user in addition to the grapheme.

Next, a conversion unit of the user terminal converts the input grapheme into a grapheme image (S802) and the converted grapheme image is transmitted to a server through a terminal communication unit of the user terminal. In the exemplary embodiment, the conversion unit may be implemented as a general-purpose web-browser.

Thereafter, a server communication unit of the server receives the grapheme image and an extraction unit of the server vectorizes an outline and a center line of the received grapheme image to extract outline vector data and center line vector data (S803).

A generation unit of the server generates grapheme data by adding the number of outline points, the number of center line points, a grapheme name, a grapheme type, and a grapheme identification code to the extracted outline vector data and center line vector data extracted from the extraction unit (S804). In this case, the generated grapheme data is stored in a storage unit of the server.

Herein, the grapheme type may be changed to correspond to a language kind of the input grapheme. For example, when the language of the grapheme is Korean, the grapheme type may be an initial consonant, a neutral consonant, and a final consonant.

Further, the grapheme identification code may be a code acquired by combining at least one of figures, symbols, and letters assigned for each grapheme in order to identify the input grapheme.

Next, a comparison unit of the server compares at least one grapheme identification code stored in the storage unit and a predetermined grapheme identification code list (S805) and when the grapheme identification code which is not stored in the storage unit is searched in the predetermined grapheme identification code list according to the comparison result, the comparison unit generates a grapheme input request signal for requesting an input of the grapheme corresponding to the searched grapheme identification code.

In this case, the server communication unit transmits the grapheme input request signal to the terminal communication unit of the user terminal and the input unit of the user terminal receives the corresponding grapheme from the user (S801).

On the contrary, when all of the grapheme identification codes of the predetermined grapheme identification code list are stored in the storage unit, the comparison unit generates a grapheme data transmission signal for transmitting the grapheme data stored in the storage unit to an editor and the server communication unit transmits the grapheme data to an editor communication unit of the editor (S806).

A validation unit of the editor compares at least one received grapheme identification code of the grapheme data and a predetermined grapheme identification code list to validate whether receiving the grapheme data is completed (S807) and when the grapheme identification code which is not received is searched in the predetermined grapheme identification code list according to the validation result, the validation unit generates a grapheme data retransmission signal for requesting retransmission of the grapheme data corresponding to the searched grapheme identification code.

In this case, the editor communication unit transmits the grapheme data retransmission signal to the server communication unit of the server and the server communication unit retransmits the corresponding grapheme data (S806).

On the contrary, when the grapheme data corresponding to all of the grapheme identification codes of the predetermined grapheme identification code list is received, a calculation unit of the editor calculates a grapheme thickness by calculating a distance between the outline points of the outline vector data included in the grapheme data (S808).

Thereafter, a layer generation unit stores the center line vector data of the grapheme data in each of a basic layer and first to third extended layers (S809).

Next, an extension unit extends the center line vector data stored in the first extended layer with a predetermined magnification in a horizontal direction, extends the center line vector data stored in the second extended layer with a predetermined magnification in a vertical direction, and extends the center line vector data stored in the third extended layer with a predetermined magnification in the horizontal direction and the vertical direction.

Subsequently, a glyph generation unit generates the basic grapheme glyph by using the outline vector data received through the editor communication unit, and generates first to third grapheme glyphs by generating first to third outline vector data so that intervals among outline points are the same as the calculated grapheme thickness based on the center line vector data of the first to third extended layers, respectively (S810).

As a result, the glyph generation unit generates the basic grapheme glyph, and the first extended grapheme glyph extended in the horizontal direction, the second extended grapheme glyph extended in the vertical direction, and the third extended grapheme glyph extended in the horizontal and vertical directions compared with the basic grapheme glyph.

Thereafter, a grouping unit groups the basic grapheme glyph, and the first to third extended grapheme glyphs into one MMG (S811).

Last, the verification unit compares the number of grouped MMGs and the number of grapheme data received from the server communication unit of the serve to verify whether the MMG is additionally grouped (S812) and according to the comparison result, when the number of grouped MMGs is less than the number of received grapheme data, the verification unit receives the graphemes required for the MMG grouping.

On the contrary, when the number of grouped MMGs is equal to or more than the number of received grapheme data according to the comparison result, the multiple master glyph generating method according to the exemplary embodiment of the present invention ends.

The multiple master glyph generating method according to the exemplary embodiment of the present invention may be implemented by the respective components of the multiple master glyph generating system and the multiple master glyph generating method according to the exemplary embodiment of the present invention generates the fonts similarly to the multiple master glyph generating system according to the exemplary embodiment of the present invention, and as a result, a detailed description of the multiple master glyph generating method according to the exemplary embodiment of the present invention will be omitted in order to prevent a duplicated description. The present invention has been described in detail with reference to preferred embodiments thereof. However, it will be appreciated by those skilled in the art that various modifications and changes may be made in these embodiments without departing from the spirit and the scope of the invention which is defined in the appended claims.

What is claimed is:

1. A system for generating a multiple master glyph, the system comprising:
   a user terminal that receives a grapheme from a user and converts the grapheme into a grapheme image;
   a server that extracts outline vector data and center line vector data of the grapheme image; and
   an editor that
      generates a basic grapheme glyph and an extended grapheme glyph of which at least one of a horizontal length and a vertical length is extended compared with the basic grapheme glyph by using the outline vector data and the center line vector data, and
      groups the basic grapheme glyph and the extended grapheme glyph into a multiple master glyph (MMG),
   wherein
      the editor further includes
         a layer generation unit that stores the center line vector data in each of a basic layer and first, second and third extended layers, and
         an extension unit that extends the center line vector data of the first extended layer in a horizontal direction,
extends the center line vector data of the second extended layer in a vertical direction, and
extends the center line vector data of the third extended layer in the horizontal direction and the vertical direction.

2. The system of claim 1, wherein:
the user terminal includes
a display unit that displays a grapheme name to be input by the user,
an input unit that receives the grapheme from the user through handwriting, and
a conversion unit that converts the received grapheme into the grapheme image.

3. The system of claim 1, wherein:
the server includes
an extraction unit that extracts the outline vector data and the center line vector data by vectorizing an outline and a center line of the grapheme image,
a grapheme data generation unit that generates grapheme data including the outline vector data, the center line vector data, the number of outline points, the number of center line points, a grapheme name, a grapheme type, and a grapheme identification code, and
a storage unit that stores the grapheme data.

4. The system of claim 3, wherein the server further includes a comparison unit that
compares at least one grapheme identification code stored in the storage unit and a predetermined grapheme identification code list and when the grapheme identification code which is not stored in the storage unit is searched in the predetermined grapheme identification code list,
generates a grapheme input request signal for requesting an input grapheme of the searched grapheme identification code.

5. The system of claim 4, wherein the comparison unit generates a grapheme data transmission signal when all grapheme identification codes of the predetermined grapheme identification code list are stored in the storage unit.

6. The system of claim 3, wherein the editor includes a validation unit that compares, when the grapheme data is received from the server, the grapheme identification code of the received grapheme data and the predetermined grapheme identification code list to validate whether receiving the grapheme data is completed.

7. The system of claim 3, wherein the editor includes a calculation unit that calculates a grapheme thickness by calculating a distance between the outline points.

8. The system of claim 1, wherein:
the editor
generates a basic grapheme glyph by using the outline vector data, and
further includes a glyph generation unit that generates first to third outline vector data so that intervals among outline points are the same as the grapheme thickness based on the center line vector data of first to third extended layers, respectively to generate the first to third extended grapheme glyphs.

9. The system of claim 8, wherein the editor further includes a grouping unit that groups the basic grapheme glyph, and the first, second and third extended grapheme glyphs into the MMG.

10. A method for generating a multiple master glyph, the method comprising:
receiving, by a user terminal, a grapheme from a user and converting the grapheme into a grapheme image;
extracting, by a server, outline vector data and center line vector data of the grapheme image;
generating, by an editor, a basic grapheme glyph and an extended grapheme glyph of which at least one of a horizontal length and a vertical length is extended compared with the basic grapheme glyph by using the outline vector data and the center line vector data; and
grouping, by the editor, the basic grapheme glyph, and the extended grapheme glyphs into one MMG,
wherein:
the generating further including:
storing, by a layer generation unit, the center line vector data in each of a basic layer and first to third extended layers; and
extending, by an extension unit, the center line vector data of the first extended layer in a horizontal direction;
extending the center line vector data of the second extended layer in a vertical direction; and
extending the center line vector data of the third extended layer in the horizontal direction and the vertical direction.

11. The method of claim 10, wherein:
the converting of the grapheme into the grapheme image includes
displaying, by a display unit, a grapheme name to be input by the user,
receiving, by an input unit, the grapheme from the user through handwriting, and
converting, by a conversion unit, the received grapheme into the grapheme image.

12. The method of claim 10, wherein:
the extracting of, by the server, the outline vector data and the center line vector data of the grapheme image includes
extracting, by an extraction unit, the outline vector data and the center line vector data by vectorizing an outline and a center line of the grapheme image,
generating, by a grapheme data generation unit, grapheme data including the outline vector data, the center line vector data, the number of outline points, the number of center line points, a grapheme name, a grapheme type, and a grapheme identification code, and
storing, by a storage unit, the grapheme data.

13. The method of claim 12, wherein the extracting of, by the server, the outline vector data and the center line vector data of the grapheme image further includes comparing, by a comparison unit, at least one grapheme identification code stored in the storage unit and a predetermined grapheme identification code list and when the grapheme identification code which is not stored in the storage unit is searched in the predetermined grapheme identification code list, generating a grapheme input request signal for requesting an input grapheme of the searched grapheme identification code.

14. The method of claim 13, wherein the extracting of the outline vector data and the center line vector data of the grapheme image further includes generating, by the comparison unit, a grapheme data transmission signal when all grapheme identification codes of the predetermined grapheme identification code list are stored in the storage unit.

15. The method of claim 12, wherein the generating of the basic grapheme glyph and the extended grapheme glyph includes comparing, by a validation unit, when the grapheme data is received from the server, the grapheme identification code of the received grapheme data and the predetermined grapheme identification code list to validate whether receiving the grapheme data is completed.

16. The method of claim 12, wherein the generating of the basic grapheme glyph and the extended grapheme glyph includes calculating, by a calculation unit, a grapheme thickness by calculating a distance between the outline points.

17. The method of claim 10, wherein the generating of the basic grapheme glyph and the extended grapheme glyph further includes generating, by a glyph generation unit, the basic grapheme glyph by using the outline vector data, and first to third outline vector data so that intervals among outline points are the same as the grapheme thickness based on the center line vector data of first to third extended layers, respectively to generate first to third extended grapheme glyphs.

18. The method of claim 17, wherein the grouping into the MMG includes grouping, by a grouping unit, the basic grapheme glyph and the first to third extended grapheme glyphs into the MMG.

* * * * *